(12) United States Patent
Sonehara et al.

(10) Patent No.: US 7,183,023 B2
(45) Date of Patent: Feb. 27, 2007

(54) METHOD FOR MANUFACTURING COLOR FILTER

(75) Inventors: Akio Sonehara, Tokyo (JP); Hironori Kobayashi, Tokyo (JP); Norikatsu Nakamura, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 44 days.

(21) Appl. No.: 10/408,473

(22) Filed: Apr. 7, 2003

(65) Prior Publication Data

US 2004/0197682 A1    Oct. 7, 2004

(51) Int. Cl.
G02B 5/20 (2006.01)
G02F 1/1335 (2006.01)
B41J 2/01 (2006.01)

(52) U.S. Cl. .......................... 430/7; 427/164; 427/277; 427/278; 427/356; 427/358; 427/359; 347/106

(58) Field of Classification Search .................. 430/7; 347/106, 107; 427/271, 277, 278, 355, 356, 427/358, 359, 164
See application file for complete search history.

(56) References Cited

U.S. PATENT DOCUMENTS 6,294,313 B1 * 9/2001 Kobayashi et al. ......... 430/302

FOREIGN PATENT DOCUMENTS

| JP | 61-003122 A | * | 1/1986 |
| JP | 62-280802 A | * | 12/1987 |
| JP | 8-220335 A | * | 8/1996 |
| JP | 9-189806 A | * | 7/1997 |
| JP | 10-319227 A | * | 12/1998 |
| JP | 11-095025 A | * | 4/1999 |
| JP | 11-337726 |   | 12/1999 |

* cited by examiner

Primary Examiner—John A. McPherson
(74) Attorney, Agent, or Firm—Timothy J. Keefer; Seyfarth Shaw LLP (57) ABSTRACT

The main object of the present invention is to provide a method for manufacturing a color filter, capable of having the surface of the pixel part flatly even in the case a pixel part is formed by an ink discharging method, and the thickness of each pixel part evenly. In order to achieve the above-mentioned object, the present invention provides a method for manufacturing a color filter comprising at least a pixel part forming process of forming a pixel part of a plurality of colors in a predetermined pattern by adhering an ink on a transparent substrate by a discharging method, and the convex pixel part is formed in the pixel part forming process, wherein a pixel part flattening process of flattening the convex pixel part is executed after the pixel part forming process.

22 Claims, 1 Drawing Sheet

METHOD FOR MANUFACTURING COLOR FILTER

BACKGROUND OF THE INVENTION

1. Field of the Invention

The present invention relates to a method for manufacturing a color filter suitable for a color liquid crystal display, capable of obtaining an even pixel part even in the case the pixel part is formed by an discharging method such as an ink jet method.

2. Description of the Related Art

Recently, accompanied by development of the personal computers, in particular, development of the portable personal computes, demand to liquid crystal displays, particularly color liquid crystal displays tends to be increasing. However, since color liquid crystal displays are expensive, decrease of the cost is highly requested. In particular, decrease of the cost of color filters, which accounts for a large proportion in terms of the cost, is highly requested.

In general, such color filters comprises coloring pattern of the three primary colors of red (R), green (G) and blue (B). A liquid crystal functions as a shutter by switching an electrode which corresponds to each pixel of R, G, and B on and off, and light goes through each pixel of R, G and B so that color display is possible.

Among the methods for manufacturing the color filters, for example, there is a method for obtaining a color filter by ejecting an ink by an ink jet method onto a lyophilic area of a substrate which patterns of different wettabilities are formed, and adhering the ink so as to form a pixel part (Japanese Patent Application Laid Open (JP-A) No. 11-337726). The method is useful as a manufacturing method for a color filter since, in general, the coloring patterns of the three primary colors of red (R), green (G) and blue (B) can be colored at the same time so that there is an advantage of being able to make the processes simple.

However, according to the method, since the ink is adhered on the lyophilic area utilizing the wettability difference, the central part of the pixel part is formed inevitably in a convex form. There is a problem that there is a risk of generating the color unevenness in the pixel part if the pixel part is provided in such a convex form. Moreover, in the case the pixel part is formed by the ink discharging method such as the ink jet method, the discharging amount of each color may be different so that the thickness may be different among the pixels. In this case, the coloring unevenness is generated depending on the pixel parts, and thus it is not preferable. Furthermore, a problem of unevenness of the cell gap is also involved.

SUMMARY OF THE INVENTION

The present invention has been achieved in view of the above-mentioned problems, and the main object thereof is to provide a method for manufacturing a color filter, capable of having an even pixel part surface and an even thickness of the pixel parts, though a pixel part is formed by an ink discharging method.

In order to achieve the above-mentioned object, the present invention provides a method for manufacturing a color filter comprising at least a pixel part forming process of forming a pixel part of a plurality of colors in a predetermined pattern by adhering an ink on a transparent substrate by a discharging method, and a convex pixel part is formed in the pixel part forming process, wherein a pixel part flattening process of flattening the convex pixel part is executed after the pixel part forming process.

Thus, in the present invention, since the pixel part flattening process is executed after the pixel part forming process, even if the pixel part of the color filter is formed by a discharging method, the pixel part surface is flat so that the color unevenness is not generated in the pixel part. Moreover, since the thickness of the pixel part can be made constant by the pixel part flattening process, the coloring unevenness due to the pixel part can be eliminated, and furthermore, the cell gap can be provided evenly.

In the present invention, furthermore, a process of forming a light shielding part may be comprised. That is because the manufacturing method for a color filter of the present invention can be adopted both in a color filter with a light shielding part and in a color filter without a light shielding part.

Moreover, in the present invention, it is preferable to execute the above-mentioned pixel part flattening process after making the above-mentioned convex pixel part in a semi-cured state. That is because the pixel part flattening process cannot be executed accurately in the case the pixel part is in an un-cured state or a cured state.

Furthermore, in the present invention, the above-mentioned pixel part flattening process may be a process of flattening the convex pixel part by applying a pressure from above. In this case, it is preferable that the process of flattening the above-mentioned convex pixel part by applying a pressure from above is a process of using a cylinder pressure roll or a process of using a plane press.

In contrast, in the present invention, the above-mentioned pixel part flattening process may be a process of flattening by eliminating the upper part of the convex pixel part. In this case, it is preferable that the process of flattening by eliminating the upper part of the convex pixel part is a process of scraping off the upper part of the pixel part using a doctor blade, a process of cutting off the upper part of the pixel part using a blade cutter, or a process of shaving off the upper part of the pixel part by polishing.

Furthermore, in the present invention, it is preferable that the above-mentioned discharging method is executed by an ink jet method. By adhering an ink by the ink jet method, the ink can be adhered with a good positioning accuracy so that the quality of the color filter to be obtained can be improved.

Moreover, in the present invention, it is preferable that the above-mentioned pixel part forming process is a process of forming a wettability variable layer, capable of changing the surface wettability, on the transparent substrate, and adhering an ink in the ink-philic area of the wettability variable layer. In particular, it is preferable that the above-mentioned wettability variable layer is a photocatalyst containing layer comprising at least a photocatalyst and a binder, and the wettability is changed by the energy irradiation so as to lower the contact angle with a liquid.

By forming such a layer, an ink-philic area with a small contact angle with a liquid can be formed by easily changing the wettability of the layer by executing an energy pattern irradiation, or the like so that, for example, only a part where a pixel part is formed can be made to be an ink-philic area easily. Therefore, a color filter can be manufactured efficiently so that it is advantageous in terms of the cost.

As mentioned above, the photocatalyst containing layer used in the present invention comprises at least a photocatalyst and a binder. The photocatalyst is preferably one kind or two or more kinds of substances selected from a titanium oxide ($TiO_2$), a zinc oxide (ZnO), a tin oxide ($SnO_2$), a strontium titanate ($SrTiO_3$), a tungsten oxide ($WO_3$), a bismuth oxide ($Bi_2O_3$), and an iron oxide ($Fe_2O_3$). In particular, a titanium oxide ($TiO_2$) is preferable since the band gap energy of a titanium oxide is high so that it is effective as a photocatalyst, and furthermore, it is chemically stable, it does not have toxicity, and it can easily be obtained.

Moreover, in the above-mentioned color filter, it is preferable that the binder as another component comprising the photocatalyst containing layer is an organo polysiloxane as a hydrolyzed condensation product or a co-hydrolyzed condensation product of one kind or two or more kinds of silicon compounds represented by $Y_nSiX_{(4-n)}$ (here, Y is an alkyl group, a fluoro alkyl group, a vinyl group, an amino group, a phenyl group or an epoxy group, and X is an alkoxyl group or a halogen. N is an integer from 0 to 3.).

Furthermore, in the present invention, it is preferable that the contact angle with a liquid having a 40 mN/m surface tension, on the above-mentioned photocatalyst containing layer, is 10 degrees or more at a part without the energy irradiation, and it is less than 10 degrees at a part with the energy irradiation. Since the part without the energy irradiation is required to have the ink repellent property, if the contact angle with a liquid having a 40 mN/m surface tension is less than 10 degrees, the ink repellent property is not sufficient so that the ink may be remained, and thus it is not preferable. Moreover, if the contact angle of the part with the energy irradiation with a liquid having a 40 mN/m surface tension is 10 degrees or more, the ink spreading performance in this part may be poor so that color omission, or the like can be generated in the pixel part.

Furthermore, the present invention provides a color filter manufactured by the above-mentioned method. Such a color filter has a flat pixel part surface so that color unevenness is not generated in the pixel part. Moreover, since the pixel part thickness can be made constant, there is no coloring unevenness due to the pixel part, and the cell gap can be provided evenly.

Furthermore, the present invention provides a color filter comprising at least a transparent substrate, and a pixel part of a plurality of colors formed in a predetermined pattern by adhering an ink by a discharging method on the transparent substrate, and the thickness difference of each pixel part is in a range of ±0.5 µm. Since the color filter of the present invention has a small pixel part thickness difference, it is advantageous in that a liquid crystal display without the coloring unevenness due to the pixel part and with an even cell gap can be provided.

Such a color filter may have a light shielding part, and it is preferably one formed by the ink jet method as mentioned above.

Furthermore, in the present invention, it is preferable that the above-mentioned pixel part is formed with a UV curing ink for the convenience of the processes, and it is formed with a thermosetting ink for the reliability.

The present invention provides a color liquid crystal display comprising the above-mentioned color filter, and a substrate facing thereto, and formed by sealing a liquid crystal compound in between both substrates. Such a color liquid crystal display has the advantages of the above-mentioned color filter, that is, the advantages of elimination of the coloring unevenness due to the pixel part, and evenness of the cell gap.

Since the present invention has the pixel part flattening process after the pixel part forming process, even in the case of a color filter with the pixel part formed by a discharging method, the pixel part surface is flat, and the color unevenness is not generated in the pixel part. Moreover, since each pixel part thickness can be made constant by the pixel part flattening process, the effects of eliminating the coloring unevenness due to the pixel part and providing the cell gap evenly can be achieved.

BRIEF DESCRIPTION OF THE DRAWINGS

FIG. 1 is a process diagram for explaining an example of a method for manufacturing a color filter in the present invention.

DESCRIPTION OF THE PREFERRED EMBODIMENT

A method for Manufacturing a Color Filte

Hereinafter, a method for manufacturing a color filter of the present invention will be explained in detail. A method for manufacturing a color filter of the present invention is a method for manufacturing a color filter comprising at least a pixel part forming process of forming a pixel part of a plurality of colors in a predetermined pattern by adhering an ink on a transparent substrate by a discharging method, and a convex pixel part is formed in the pixel part forming process, wherein a pixel part flattening process of flattening the convex pixel part is executed after the pixel part forming process.

Since the present invention comprises the pixel part flattening process as mentioned above, the coloring unevenness in the pixel part or between the pixel parts can be prevented, and furthermore, the cell gap can be maintained constantly. First, the pixel part flattening process will be explained in detail.

1. Pixel Part Flattening Process

The pixel part flattening process in the present invention can be carried out on the whole by the two methods. The first method is a method of flattening the convex pixel part by applying a pressure from above. The second method is a method of flattening by eliminating the upper part of the convex pixel part.

As to the method of applying a pressure from above as the above-mentioned first method, it is not particularly limited as long as it is a method capable of evenly press the convex pixel part by a linear pressure or a surface pressure. As a method for applying a pressure by a linear pressure, for example, a method of using a cylinder pressure roll, or the like can be presented. Moreover, as a method for applying a pressure by the surface pressure, a method of using a plane press, or the like can be presented.

In these methods, it is preferable that for the part which comes into in contact with the pixel part such as the surface of the cylinder pressure roll, the surface of the plane press, or the like, a material which the contacted pixel part dose not adhere is used Specifically, a copolymer of a dimethyl polysiloxane and at least one kind selected from a butyl acrylate, a 2-ethyl hexyl acrylate, a butyl methacrylate, a 2-isocyanate ethyl, and a methacrylate, or a dimethyl polysiloxane, a methyl phenyl polysiloxane, a methyl fluoro polysiloxane, or the like can be presented. The molecular weight of these substances is preferably 100,000 to 1,000,000 based on the weight average molecular weight.

Then, in such a silicone based copolymer, it is preferable that the loss tangent tan δ is 0.01 to 0.2, and the complex elastic modulus is $10^6$ to $10^7$ dyne/$cm^2$. Furthermore, the critical surface tension is preferably 17 to 37 dyne/cm, more preferably 20 to 26 dyne/cm.

Moreover, a method of pressing the convex part of the pixel part, via a film or the like, to the part of the surface of the cylinder pressure roll, the surface of the planar press, or the like, which comes into contact with the pixel part, and removing the film after finishing the flattening process may be used as well. As a film to be used in such methods, for example, a polyethylene terephthalate, a polycarbonate, a polyphenylene sulfide, a polyimide, a polyethylene naphthalate, a polyvinyl chloride, a polyether sulfone, a polyamide imide, a polyamide, an aromatic polyamide, or the like can be presented.

In contrast, as a method of eliminating the upper part of the convex pixel part as the above-mentioned second method, specifically, a method of scraping off the upper part of the pixel part using a doctor blade, a method of cutting off the upper part of the pixel part using a blade cutter, a method of shaving off the upper part of the pixel part by polishing, or the like can be presented.

In the pixel part flattening process in the present invention, although it depends on the flattening method, it is preferable to execute a pixel part flattening process after making the pixel part in a semi-curing state.

Specifically, it is preferable to carry out the pixel part flattening process after making the ink viscosity of the pixel part in a range of 500 cps to 300,000 cps.

In particular, in the case the above-mentioned pixel part flattening process is the first method of flattening the convex pixel part by applying a pressure from above, it is more preferable that the pixel part is in a semi-curing state, and as to the viscosity in this case, it is preferably in a range of 1,000 cps to 20,000 cps particularly in the above-mentioned range.

As a method of measuring the viscosity of the ink in a semi-curing state in this case, a method of collecting the ink in a semi-curing state by a doctor blade or a squeegee for screen printing, and measuring with an R type viscometer (for example, RE500U manufactured by TOKI SANGYO CO., LTD.) is adopted. As to the measuring condition, measurement is carried out by the shear rate: $10 \text{ s}^{-1}$.

2. Pixel Part Forming Process

The manufacturing method for a color filter of the present invention is characterized in comprising the above-mentioned pixel part flattening process. As the premise thereof, the method is adopted in a method for manufacturing a color filter comprising at least a pixel part forming process of forming a pixel part of a plurality of colors in a predetermined pattern by adhering an ink on a transparent substrate by a discharging method, and a convex pixel part is formed in the pixel part forming process.

(Discharging Method)

As a discharging method in the present invention, for example, a method of jetting a pixel part forming ink from a micro syringe, a dispenser, an ink jet, or a needle tip by the external stimulus such as the electric field, a method of jetting a pixel part forming ink from an element, using a vibrating element such as a piezoelectric element which is vibrated by the external stimulus, a method of adhering a pixel part forming ink adhered on a needle tip to the substrate surface, or the like can be presented.

In the present invention, among the above-mentioned discharging methods, from the viewpoint of the coating accuracy and speed, or the like, it is preferable to form the pixel part by the ink jet method. In this case, as a ink jet apparatus to be used, although it is not particularly limited, the ink jet apparatus using the various kinds of methods such as a method of continuously jetting a charged ink and controlling the same by the magnetic field, a method of intermittently jetting an ink using a piezoelectric element, and a method of heating an ink and intermittently jetting the same utilizing the bubbles, can be used.

In the present invention, "by adhering an ink on the transparent substrate" refers to not only the case of directly adhering an ink on the transparent substrate but also the case of forming a layer of some sort on the transparent substrate and adhering an ink thereon.

(Pixel Part)

The pixel part formed accordingly by the discharging method, in general, is formed with the three colors of red (R), green (G) and blue (B). The coloring pattern and the coloring area in the pixel part can be set optionally.

In the case such a pixel part is formed, it is preferable to carry out by the ink jet method among the discharging methods as mentioned above. The inks to be used in the ink jet method can be classified on the whole to the water based type and the oil based type. In the present invention, either type can be used, however, in terms of the surface tension, the water based inks are preferable.

In the water based inks used in the present invention, as a solvent, water alone, or a solvent mixture of water and a water soluble organic solvent can be used. In contrast, in the oil based inks, those having a high boiling point solvent as a base can be used preferably for preventing blocking of the head, or the like. As the coloring agents used for these ink jet method inks, known pigments and dyes can be sued widely. Moreover, it is also possible to contain soluble or insoluble resins in the solvent for improving the dispersing property and the fixing property. Additionally, the surfactants such as a nonionic surfactant, a cationic surfactant, and an amphoteric surfactant; the antiseptics; the corrosion preventing agents; the pH adjusting agents; the antifoaming agents; the ultraviolet ray absorbing agents; the viscosity adjusting agents; the surface tension adjusting agents, or the like may be added as needed.

Moreover, since an ordinary ink for the ink jet method has a low suitable viscosity, it cannot contain a binder resin by a large amount. However, by granulating the coloring agent particles in the ink so as to be contained by the resin, the fixing ability can be provided to the coloring agent itself. Such an ink can be used in the present invention.

Furthermore, in the present invention, the so-called hot melt ink, the UV curing type ink, and furthermore, the thermosetting type ink can be used as well. In the present invention, in particular, it is preferable to use the UV curing type ink and the thermosetting type ink.

The UV curing type ink can be quickly cured by the UV irradiation after forming the pixel part by coloring by the ink jet method, so that the next process can be carried out immediately. Therefore, the color filter can be manufactured efficiently. In contrast, the thermosetting type ink is high in the material reliability, and furthermore, the processes can be simplified.

The UV curing type ink contains a prepolymer, a monomer, an photoinitiator and a coloring agent as the main components. As the prepolymer, any of the prepolymers such as a polyester acrylate, a polyurethane acrylate, an epoxy acrylate, a polyether acrylate, an oligo acrylate, an alkyd acrylate, a polyol acrylate, and a silicon acrylate can be used without limitation.

As the monomer, vinyl monomers such as a styrene, and a vinyl acetate; monofunctional acrylic monomers such as an n-hexyl acrylate, and a phenoxy ethyl acrylate; and polyfunctional acrylic monomers such as a diethylene glycol diacrylate, a 1,6-hexane diol diacrylate, an ester neopentyl glycol diacrylate hydroxylpiperate, a trimethylol propane triacrylate, and a dipenta erythritol hexaacrylate can be used. The above-mentioned prepolymers and monomers can be used alone or as a mixture of two or more kinds.

As the photo polymerization initiator, one capable of obtaining the desired curing characteristic and recording characteristic can be used selectively from an isobutyl benzoin ether, an isopropyl benzoin ether, a benzoin ethyl ether, a benzoin methyl ether, a 1-phenyl-1,2-propadion-2-oxime, a 2,2-dimethoxy-2-phenyl acetophenone, a benzyl, a hydroxyl cyclohexyl phenyl ketone, a diethoxy acetophenone, a 2-hydroxy-2-methyl-1-phenyl propane-1-on, a benzophenone, a chloro thioxanthone, a 2-chloro thioxanthone, an isopropyl thioxanthone, a 2-methyl thioxanthone, a chlorine substituted benzophenone, a halogen substituted alkyl-allyl ketone, or the like. Additionally, as needed, the photoinitiating auxiliary agents such as an aliphatic amine and an aromatic amine; the photosensitizing agents such as a thioxanthone may be added.

In contrast, as the thermosetting ink, in general, at least a binder and a bifunctional or trifunctional epoxy group containing monomer are included as the essential component, and furthermore, as needed, a coloring agent, a dispersing agent, a curing promoting agent, or the other additives may be included as well. Moreover, in order to provide the appropriate flowability and discharging property, to be used in the ink jet method, to the thermosetting ink, the above-mentioned components may be dissolved or dispersed in a solvent (diluting agent). Furthermore, together with the above-mentioned bifunctional or trifunctional epoxy group containing monomer, a tetrafunctional or more epoxy group containing resin may be used in a combination.

As the binder used for the thermosetting type ink, either a resin without the polymerization reactivity itself, or a resin having the polymerization reactivity itself may be used. Moreover, two or more kinds of binders may be used in a combination.

In the case a resin without the polymerization reactivity is used as the binder, the bifunctional or trifunctional epoxy group containing monomer as the essential component in the thermosetting type ink, and the other thermosetting components as the optional component are polymerized and cured by heating.

As the non-polymerizable binder, for example, a copolymer comprising two or more kinds of the following monomers can be used: an acrylic acid, a methacrylic acid, a methyl acrylate, a methyl methacrylate, a 2-hydroxy ethyl acrylate, a 2-hydroxy ethyl methacrylate, a benzyl acrylate, a benzyl methacrylate, a styrene, a polystyrene macro monomer, and a polymethyl methacrylate macro monomer.

More specifically, the acrylic acid copolymers such as an acrylic acid/benzyl acrylate copolymer, an acrylic acid/methyl acrylate/styrene copolymer, an acrylic acid/benzyl acrylate/styrene copolymer, an acrylic acid/methyl acrylate/polystyrene macro monomer copolymer, an acrylic acid/methyl acrylate/polymethyl methacrylate macro monomer copolymer, an acrylic acid/benzyl acrylate/polystyrene macro monomer copolymer, an acrylic acid/benzyl acrylate/polymethyl methacrylate macro monomer copolymer, an acrylic acid/2-hydroxy ethyl acrylate/benzyl acrylate/polystyrene macro monomer copolymer, an acrylic acid/2-hydroxy ethyl acrylate/benzyl acrylate/polymethyl methacrylate macro monomer copolymer, an acrylic acid/benzyl methacrylate copolymer, an acrylic acid/methyl methacrylate/styrene copolymer, an acrylic acid/benzyl methacrylate/styrene copolymer, an acrylic acid/methyl methacrylate/polystyrene macro monomer copolymer, an acrylic acid/methyl methacrylate/polymethyl methacrylate macro monomer copolymer, an acrylic acid/benzyl methacrylate/polystyrene macro monomer copolymer, an acrylic acid/benzyl methacrylate/polymethyl methacrylate macro monomer copolymer, an acrylic acid/2-hydroxy ethyl methacrylate/benzyl methacrylate/polystyrene macro monomer copolymer, and an acrylic acid/2-hydroxy ethyl methacrylate/benzyl methacrylate/polymethyl methacrylate macro monomer copolymer can be used.

As still further specific examples, the methacrylic acid copolymers such as a methacrylic acid/benzyl acrylate copolymer, a methacrylic acid/methyl acrylate/styrene copolymer, a methacrylic acid/benzyl acrylate/styrene copolymer, a methacrylic acid/methyl acrylate/polystyrene macro monomer copolymer, a methacrylic acid/methyl acrylate/polymethyl methacrylate macro monomer copolymer, a methacrylic acid/benzyl acrylate/polystyrene macro monomer copolymer, a methacrylic acid/benzyl acrylate/polymethyl methacrylate macro monomer copolymer, a methacrylic acid/2-hydroxy ethyl acrylate/benzyl acrylate/polystyrene macro monomer copolymer, a methacrylic acid/2-hydroxy ethyl acrylate/benzyl acrylate/polymethyl methacrylate macro monomer copolymer, a methacrylic acid/benzyl methacrylate copolymer, a methacrylic acid/methyl methacrylate/styrene copolymer, a methacrylic acid/benzyl methacrylate/styrene copolymer, a methacrylic acid/methyl methacrylate/polystyrene macro monomer copolymer, a methacrylic acid/methyl methacrylate/polymethyl methacrylate macro monomer copolymer, a methacrylic acid/benzyl methacrylate/polystyrene macro monomer copolymer, a methacrylic acid/benzyl methacrylate/polymethyl methacrylate macro monomer copolymer, a methacrylic acid/2-hydroxy ethyl methacrylate/benzyl methacrylate/polystyrene macro monomer copolymer, and a methacrylic acid/2-hydroxy ethyl methacrylate/benzyl methacrylate/polymethyl methacrylate macro monomer copolymer can be presented.

Among the above-mentioned non-polymerizable binders, in particular, a methacrylic acid/benzyl methacrylate copolymer, a methacrylic acid/benzyl methacrylate/styrene copolymer, a benzyl methacrylate/styrene copolymer, a benzyl methacrylate macro monomer/styrene copolymer, a benzyl methacrylate/styrene macro monomer copolymer, or the like are preferable.

In contrast, as the binder having the polymerizable property itself, an oligomer with a thermally polymerizable functional group such as an epoxy group introduced to a molecule of a non-polymerizable binder, or a polymer having a molecular weight larger than that of the oligomer can be used. The molecules of the polymerizable binder are polymerized with each other in the binder, and they are polymerized also with the bifunctional or trifunctional polyfunctional monomer, and the other polymerizable monomer as the optional component so as to be cured thermally.

As the thermally polymerizable binder, for example, a homopolymer or a copolymer obtained by polymerizing one kind or two or more kinds of a monomer containing an ethylenically unsaturated bond and an epoxy group as mentioned below can be used: the (meth)acrylates such as a glycidyl acrylic acid, a glycidyl methacrylic acid, an α-ethyl glycidyl acrylic acid, an α-n-glycidyl propyl acrylic acid, an α-n-glycidyl butyl acrylic acid, an acrylic acid-3,4-epoxy butyl, a methacrylic acid-3,4-epoxy butyl, a methacrylic acid-4,5-epoxy pentyl, an acrylic acid-6,7-epoxy heptyl, a methacrylic acid-6,7-epoxy heptyl, and an α-ethyl acrylic acid-6,7-epoxy heptyl; vinyl glycidyl ethers such as an o-vinyl phenyl glycidyl ether, an m-vinyl phenyl glycidyl ether, a p-vinyl phenyl glycidyl ether, an o-vinyl benzyl glycidyl ether, an m-vinyl benzyl glycidyl ether, and a p-vinyl benzyl glycidyl ether; a 2,3-diglycidyl oxystyrene, a 3,4-diglycidyl oxystyrene, a 2,4-diglycidyl oxystyrene, a 3,5-diglycidyl oxystyrene, a 2,6-diglycidyyl oxystyrene, a 5-vinyl pyrogallol triglycidyl ether, a 4-vinyl pyrogallol triglycidyl ether, a vinyl fluoro glycinol triglycidyl ether, a 2,3-dihydroxy methyl styrene diglycidyl ether, a 3,4-dihydroxy methyl styrene diglycidyl ether, a 2,4-dihydroxy methyl styrene diglycidyl ether, a 3,5-dihydroxy methyl styrene diglycidyl ether, a 2,6-dihydroxy methyl styrene diglycidyl ether, a 2,3,4-trihydroxymethyl styrene triglycidyl ether, and a 1,3,5-trihydroxy methyl styrene triglycidyl ether.

Moreover, a copolymer obtained by polymerizing one or two or more kinds of the above-mentioned monomer containing an ethylenically unsaturated bond and an epoxy group, and a monomer not containing an epoxy group as follows can be used as the thermally polymerizable binder as well: an acrylic acid, a methacrylic acid, a methyl acrylate, a methyl methacrylate, a 2-hydroxy ethyl acrylate, a 2-hydroxy ethyl methacrylate, a benzyl acrylate, a benzyl methacrylate, a styrene, a polystyrene macro monomer, and a polymethyl methacrylate macro monomer.

The binder is blended in general by a 1 to 50% by weight ratio to the solid component total amount of the thermosetting type ink. Here, the solid component of the thermosetting ink for specifying the composition ratio includes all the components excluding the solvent, and a liquid polymerizable monomer is included in the solid component as well.

(Convex Pixel Part)

Moreover, the present invention is adopted in the case the above-mentioned pixel part formed in the above-mentioned pixel part forming process is in a convex form. Here, "the pixel part is in a convex form" denotes the case that the highest part of the inner side is higher than the average height of the periphery of the pixel part at the time of finishing the pixel part forming process by at least 1 μm or more, preferably by 2 μm or more. If there is no height difference to the degree, the necessity of executing the above-mentioned pixel part flattening process is not high.

Accordingly, there are various kinds of the pixel part forming methods of forming a pixel part by adhering an ink on a transparent substrate by the discharging method, and providing the formed pixel part in a convex form, and thus in the present invention it is not limited to a specific pixel part forming method. As the specific methods, for example, a method of forming a convex part preliminarily in the periphery of the pixel part forming part for forming the pixel part before forming a pixel part, and adhering an ink by the discharging method in the pixel part forming part surrounded by the convex part, a method of forming a pixel part by forming a wettability variable layer to have the wettability changed by the external stimulus on a transparent substrate, changing the wettability by applying the external stimulus in a pattern, adhering an ink by the discharging method onto the part with a good wettability, or the like can be presented.

In the present invention, in particular, the above-mentioned method of forming the wettability variable layer with the wettability changed by the external stimulus, and forming the pixel part thereon is preferable. According to the method, by applying the external stimulus in a pattern, a pattern with a different wettability can be formed easily, and the pixel part can be formed efficiently only by adhering an ink by the discharging method to the part with a good wettability therein.

Hereinafter, such a wettability variable layer will be explained.

(Wettability Variable Layer)

The wettability variable layer used in the present invention is not particularly limited as long as it is a layer capable of changing the wettability of the surface by the external stimulus, such as a physical stimulus, and a chemical stimulus. For example, it may be a layer with the wettability changed by the surface roughness state change by an acid, an alkaline, or the like. Moreover, it may be a layer with the wettability changed by the substance change in the wettability variable layer by an energy irradiation of an ultraviolet ray, a visible ray, heat, or the like.

Moreover, as to the wettability change, it may be a wettability variable layer to have the contact angle with a liquid before the application of the stimulus larger and the contact angle with a liquid after the application of the stimulus smaller. Moreover, on the contrary, it may be a wettability variable layer to have the contact angle with a liquid before the application of the stimulus smaller, and the contact angle with a liquid after the application of the stimulus larger.

(Photocatalyst Containing Layer)

In the present invention, it is preferable that the wettability variable layer is a photocatalyst containing layer with the wettability changed such that the contact angle with a liquid is lowered by to an energy irradiation. Accordingly, by providing the photocatalyst containing layer with the wettability changed so as to have the contact angle with a liquid is lowered by an exposure (in the present invention, it denotes not only a light beam irradiation but also a energy irradiation.), the wettability can be changed easily by the energy pattern irradiation, or the like so that an ink-philic area with a small contact angle with a liquid can be provided, and thus for example, only a part for forming the pixel part can be provided easily as an ink-philic area. Therefore, a color filter can be manufactured efficiently, and thus it is advantageous in terms of the cost. As the energy in this case, in general, a light beam including an ultraviolet ray is used.

Here, the ink-philic area denotes an area with a small contact angle with a liquid, and thus it is an area with a good wettability to an ink or the like by a discharging method. Moreover, an ink repellent area denotes an area with a large contact angle with a liquid, and thus it is an area with a poor wettability to an ink or the like by a discharging method.

It is preferable that the above-mentioned photocatalyst containing layer has a contact angle of 10 degrees or more with a liquid having a 40 mN/m surface tension in an unexposed part, preferably a contact angle of 10 degrees or more with a liquid having a 30 mN/m surface tension, and in particular, a contact angle of 10 degrees or more with a liquid having a 20 mN/m surface tension. Since the unexposed part is a part requiring the ink repellent property in the present invention, in the case the contact angle with a liquid is small, the ink repellent property is not sufficient so that the ink may remain, and thus it is not preferable.

Moreover, it is preferable that the above-mentioned photocatalyst containing layer is a layer to have the contact angle with a liquid lowered by an exposure so as to have a contact angle of less than 10 degrees with a liquid having a 40 mN/m surface tension, preferably a contact angle of 10 degrees or less with a liquid having a 50 mN/m surface tension, and in particular, a contact angle of 10 degrees or less with a liquid having a 60 mN/m surface tension. In the case the contact angle with a liquid is high in an exposed part, the ink spreading property in this part may be deteriorated so that the color omission, or the like may be generated in the pixel part.

The contact angle with a liquid here is obtained from the results or a graph of the results of measuring (30 seconds after dropping liquid droplets form a micro syringe) the contact angle with liquids having various surface tensions using a contact angle measuring device (CA-Z type manufactured by Kyowa Interface Science Co., LTD.). Moreover, at the time of the measurement, as the liquids having the various surface tensions, wettability index standard solutions manufactured by JUNSEI CHEMICAL CO., LTD. were used.

It is preferable that the photocatalyst containing layer of the present invention comprises at least a photocatalyst and a binder. By providing such a layer, the critical surface tension can be made higher by the function of the photocatalyst by the light beam irradiation so that the contact angle with a liquid can be made lower.

Although the functional mechanism of the photocatalyst represented by a titanium oxide, described below, in such a photocatalyst containing layer is not clear, it is considered that a carrier produced by the light beam irradiation influences the chemical structure of an organic substance by the direct reaction with a compound in the vicinity, or by the active oxygen specie produced in the presence of an oxygen and water.

In the case a photocatalyst containing layer is used as the wettability variable layer in the present invention, by the photocatalyst, by using the function of oxidation, decomposition, or the like of an organic group or an additive as a part of the binder, the wettability of the exposed part is changed into an ink-philic property so that a large difference in the wettability can be generated with respect to the non exposed part. Therefore, by improving the receptivity (ink-philic property) and the repulsion property (ink repellent property) to an ink by the discharging method, a color filter with a good quality and advantageous in terms of the cost can be obtained.

Moreover, in the present invention, in the case such a photocatalyst containing layer is used, the photocatalyst containing layer may contain at least a photocatalyst and a fluorine, and furthermore, the photocatalyst containing layer may be formed so that the fluorine content of the photocatalyst containing layer surface is lowered with respect to the state before the energy irradiation by the function of the above-mentioned photocatalyst when an energy is irradiated to the photocatalyst containing layer.

In a color filter having such characteristics, by irradiating energy in a pattern, a pattern having a part with a small fluorine content can be formed easily. Here, since the fluorine has an extremely low surface energy, the surface of s substance containing a large amount of a fluorine has a smaller critical surface tension. Therefore, the critical surface tension of a part with a small fluorine content is larger than the critical surface tension of the surface of a substance with a large fluorine content. That is, it denotes that the part with a small fluorine content becomes an ink-philic area compared with the part with a large fluorine content. Therefore, by forming a pattern comprising a part with a small fluorine content compared with the surface of the periphery, a pattern of an ink-philic area is formed in an ink repellent area.

Therefore, in the case such a photocatalyst containing layer is used, since an ink-philic area pattern can be formed easily in the ink repellent area by a pattern irradiation of energy, the pixel part, or the like can be easily formed only in the ink-philic area so that a color filter with a good quality can be provided.

As to the fluorine content in the photocatalyst containing layer containing a fluorine as mentioned above, the fluorine content in the ink-philic area having a low fluorine content formed by an energy irradiation is 10 or less, preferably 5 or less, and particularly preferably 1 or less, based on the fluorine content in the area without the energy irradiation as 100.

By making the fluorine content in the range, a large difference can be generated in the ink-philic property in the energy irradiated part and the unirradiated part. Thereby, by forming a pixel part or the like in the photocatalyst containing layer, the pixel part or the like can be formed accurately only in the ink-philic area with the fluorine content lowered so that a color filter can be obtained accurately. The decreasing rate is based on the weight.

As to the measurement of the fluorine content in the photocatalyst containing layer, various methods commonly executed can be used, and it is not particularly limited as long as it is a method capable of measuring the fluorine amount quantitatively on the surface such as the X-ray photoelectron spectroscopy, the ESCA (it is also referred to as the electron spectroscopy for chemical analysis), the fluorescent X ray analysis method, and the mass analysis method.

As the photocatalyst used in the present invention, those known as photo semiconductors, such as a titanium oxide ($TiO_2$), a zinc oxide (ZnO), a tin oxide ($SnO_2$), a strontium titanate ($SrTiO_3$), a tungsten oxide ($WO_3$), a bismuth oxide ($Bi_2O_3$), and an iron oxide ($Fe_2O_3$) can be presented, and one kind or two or more kinds as a mixture can be selected and used from them.

In the present invention, in particular, a titanium oxide can be used preferably since it has high band gap energy, it is chemically stable without the toxicity, and it can be obtained easily. There are an anatase type and a rutile type in the titanium oxides, and either can be used in the present invention, and the anatase type titanium oxide is preferable. The anatase type titanium oxide has a 380 nm or shorter excitation wavelength.

As the anatase type titanium oxide, for example, a hydrochloric acid peptization type anatase type titania sol (STS-02 (average particle size 7 nm) manufactured by Ishihara Sangyo Kaisha, Ltd., ST-K01 manufactured by Ishihara Sangyo Kaisha, Ltd.), a nitric acid peptization type anatase type titania sol (TA-15 (average particle size 12 nm) manufactured by Nissan Chemical Industries, Ltd.), or the like can be presented.

With a smaller particle size of the photocatalyst, the photocatalyst reaction can be generated effectively, and thus it is preferable. An average particle size of 50 nm or less is preferable, and use of a photocatalyst of 20 nm or less is particularly preferable. Moreover, with a smaller particle size of the photocatalyst, the surface roughness of the formed photocatalyst containing layer is made smaller, and thus it is preferable. With more than 100 nm particle size of the photocatalyst, the center line average surface roughness of the photocatalyst containing layer becomes large so that the ink repellent property of the non exposed part of the photocatalyst containing layer is lowered, and furthermore, appearance of the ink-philic property of the exposed part is insufficient, and thus it is not preferable.

As mentioned above, the color filter of the present invention may be a color filter obtained by containing a fluorine on the surface of the photocatalyst containing layer, pattern irradiating energy to the surface of the photocatalyst containing layer so as to lower the fluorine content in the surface of the photocatalyst containing layer, thereby forming an ink-philic area pattern in the ink repellent area, and forming the pixel part, or the like herein. Also in this case, use of a titanium dioxide as the photocatalyst is preferable as mentioned above. In the case a titanium dioxide is used accordingly, as to the fluorine content contained in the photocatalyst containing layer quantitized by analyzing with an X ray photoelectron spectroscopy, it is preferable that the fluorine (F) element is contained in the surface of the photocatalyst containing layer surface by the ratio of the fluorine (F) element by 50 or more, preferably 800 or more, and particularly preferably 1,200 or more, based on the titanium (Ti) element as 100.

Since the critical surface tension on the photocatalyst containing layer can be made sufficiently lower by containing the fluorine (F) in the photocatalyst containing layer to about this degree, the ink repellent property can be ensured in the surface, thereby the wettability difference of the surface of the patterned part with the fluorine content reduced by the energy pattern irradiation can be made larger with respect to the ink-philic area, and thus the quality of the color filter finally obtained can be improved.

Furthermore, in such a color filter, as to the fluorine content in the ink-philic area formed by the energy pattern irradiation, it is preferable that the fluorine (F) element is contained by the ratio of 50 or less, preferably 20 or less, and particularly preferably 10 or less, based on the titanium (Ti) element as 100.

By reducing the fluorine content in the photocatalyst layer to about this degree, an ink-philic property sufficient for forming the pixel part or the like can be obtained so that the pixel part or the like can be formed accurately according to the wettability difference to the ink repellent property in the part with the above-mentioned energy unirradiated, and thus a color filter with a good quality can be obtained.

In the present invention, a binder used in the photocatalyst containing layer is preferably one having high bonding energy so as not to have the principal skeleton decomposed by the photo excitation of the above-mentioned photocatalyst. For example, (1) an organo polysiloxane to provide high strength by hydrolysis or polycondensation of a chloro, alkoxy silane, or the like by the sol gel reaction, or the like, (2) an organo polysiloxane obtained by cross-linking a reactive silicone having the excellent water repellent property or the oil repellent property, or the like can be presented.

In the above-mentioned case (1), it is preferably an organo polysiloxane as a hydrolyzed condensation product or a co-hydrolyzed condensation product of one kind or two or more kinds of silicon compounds represented by the general formula:

$Y_nSiX_{(4-n)}$ (here, Y represents an alkyl group, a fluoro alkyl group, a vinyl group, an amino group, a phenyl group or an epoxy group, and X represents an alkoxyl group, acetyl group, or a halogen. N is an integer from 0 to 3.). Here, the number of carbon atoms of the group represented by Y is preferably in a range of 1 to 20. Moreover, the alkoxy group represented by X is preferably a methoxy group, an ethoxy group, a propoxy group, or a butoxy group.

Specifically, a methyl trichloro silane, a methyl tribrom silane, a methyl trimethoxy silane, a methyl triethoxy silane, a methyl triisopropoxy silane, a methyl tri t-butoxy silane; an ethyl trichloro silane, an ethyl tribrom silane, an ethyl trimethoxy silane, an ethyl triethoxy silane, an ethyl triisopropoxy silane, an ethyl tri t-butoxy silane; an n-propyl trichloro silane, an n-propyl tribrom silane, an n-propyl trimethoxy silane, an n-propyl triethoxy silane, an n-propyl triisopropoxy silane, an n-propyl tri t-butoxy silane; an n-hexyl trichloro silane, an n-hexyl tribrom silane, an n-hexyl trimethoxy silane, an n-hexyl triethoxy silane, an n-hexyl triisopropoxy silane, an n-hexyl tri t-butoxy silane; an n-decyl trichloro silane, an n-decyl tribrom silane, an n-decyl trimethoxy silane, an n-decyl triethoxy silane, an n-decyl triisopropoxy silane, an n-decyl tri t-butoxy silane; an n-octa decyl trichloro silane, an n-octa decyl tribrom silane, an n-octa decyl trimethoxy silane, an n-octa decyl triethoxy silane, an n-octa decyl triisopropoxy silane, an n-octa decyl tri t-butoxy silane; a phenyl trichloro silane, a phenyl tribrom silane, a phenyl trimethoxy silane, a phenyl triethoxy silane, a phenyl triisopropoxy silane, a phenyl tri t-butoxy silane; a tetra chloro silane, a tetra brom silane, a tetra methoxy silane, a tetra ethoxysilane, a tetra butoxy silane, a dimethoxy diethoxy silane; a dimethyl dichloro silane, a dimethyl dibrom silane, a dimethyl dimethoxy silane, a dimethyl diethoxy silane; a diphenyl dichloro silane, a diphenyl dibrom silane, a diphenyl dimethoxy silane, a diphenyl diethoxy silane; a phenyl methyl dichloro silane, a phenyl methyl dibrom silane, a phenyl methyl dimethoxy silane, a phenyl methyl diethoxy silane; a trichloro hydro silane, a tribrom hydro silane, a trimethoxy hydro silane, a triethoxy hydro silane, a triisopropoxy hydro silane, a tri t-butoxy hydro silane; a vinyl trichloro silane, a vinyl tribrom silane, a vinyl trimethoxy silane, a vinyl triethoxy silane, a vinyl triisopropoxy silane, a vinyl tri t-butoxy silane; a trifluoro propyl trichloro silane, a trifluoro propyl tribrom silane, a trifluoro propyl trimethoxy silane, a trifluoro propyl triethoxy silane, a trifluoro propyl triisopropoxy silane, a trifluoro propyl tri t-butoxy silane, a γ-glycidoxy propyl methyl dimethoxy silane, a γ-glycidoxy propyl methyl diethoxy silane, a γ-glycidoxy propyl trimethoxy silane, a γ-glycidoxy propyl triethoxy silane, a γ-glycidoxy propyl triisopropoxy silane, a γ-glycidoxy propyl tri t-butoxy silane; a γ-methacryloxy propyl methyl dimethoxy silane, a γ-methacryloxy propyl methyl diethoxy silane, a γ-methacryloxy propyl trimethoxy silane, a γ-methacryloxy propyl triethoxy silane, a γ-methacryloxy propyl triisopropoxy silane, a γ-methacryloxy propyl tri t-butoxy silane; a γ-amino propyl methyl dimethoxy silane, a γ-amino propyl methyl diethoxy silane, a γ-amino propyl trimethoxy silane, a γ-amino propyl triethoxy silane, a γ-amino propyl triisopropoxy silane, a γ-amino propyl tri t-butoxy silane; a γ-mercapto propyl methyl dimethoxy silane, a γ-mercapto propyl methyl diethoxy silane, a γ-mercapto propyl trimethoxy silane, a γ-mercapto propyl triethoxy silane, a γ-mercapto propyl triisopropoxy silane, a γ-mercapto propyl tri t-butoxy silane; a β-(3,4-epoxy cyclo hexyl) ethyl trimethoxy silane, a β-3,4-epoxy cyclo hexyl) ethyl triethoxy silane; and a partially hydrolyzed product thereof; and a mixture thereof can be used.

Moreover, as a binder, in particular, a polysiloxane containing a fluoro alkyl group can be used preferably. Specifically, a hydrolyzed condensation product or a co-hydrolyzed condensation product of one or two or more kinds of the following fluoro alkyl silanes can be presented. Those known in general as a fluorine based silane coupling agent can be used.

$CF_3(CF_2)_3CH_2CH_2Si(OCH_3)_3$;
$CF_3(CF_2)_5CH_2CH_2Si(OCH_3)_3$;
$CF_3(CF_2)_7CH_2CH_2Si(OCH_3)_3$;
$CF_3(CF_2)_9CH_2CH_2Si(OCH_3)_3$;
$(CF_3)_2CF(CF_2)_4CH_2CH_2Si(OCH_3)_3$;
$(CF_3)_2CF(CF_2)_6CH_2CH_2Si(OCH_3)_3$;

(CF$_3$)$_2$CF(CF$_2$)$_8$CH$_2$CH$_2$Si(OCH$_3$)$_3$;
CF$_3$(C$_6$H$_4$)C$_2$H$_4$Si(OCH$_3$)$_3$;
CF$_3$(CF$_2$)$_3$ (C$_6$H$_4$)C$_2$H$_4$Si(OCH$_3$)$_3$;
CF$_3$(CF$_2$)$_5$ (C$_6$H$_4$)C$_2$H$_4$Si(OCH$_3$)$_3$;
CF$_3$(CF$_2$)$_7$ (C$_6$H$_4$)C$_2$H$_4$Si(OCH$_3$)$_3$;
CF$_3$(CF$_2$)$_3$CH$_2$CH$_2$SiCH$_3$(OCH$_3$)$_2$;
CF$_3$(CF$_2$)$_5$CH$_2$CH$_2$SiCH$_3$(OCH$_3$)$_2$;
CF$_3$(CF$_2$)$_7$CH$_2$CH$_2$SiCH$_3$(OCH$_3$)$_2$;
CF$_3$(CF$_2$)$_9$CH$_2$CH$_2$SiCH$_3$(OCH$_3$)$_2$;
(CF$_3$)$_2$CF(CF$_2$)$_4$CH$_2$CH$_2$SiCH$_3$(OCH$_3$)$_2$;
(CF$_3$)$_2$CF(CF$_2$)$_6$CH$_2$CH$_2$SiCH$_3$(OCH$_3$)$_2$;
(CF$_3$)$_2$CF(CF$_2$)$_8$CH$_2$CH$_2$SiCH$_3$(OCH$_3$)$_2$;
CF$_3$(C$_6$H$_4$)C$_2$H$_4$SiCH$_3$(OCH$_3$)$_2$;
CF$_3$(CF$_2$)$_3$ (C$_6$H$_4$)C$_2$H$_4$SiCH$_3$(OCH$_3$)$_2$;
CF$_3$(CF$_2$)$_5$ (C$_6$H$_4$)C$_2$H$_4$SiCH$_3$(OCH$_3$)$_2$;
CF$_3$(CF$_2$)$_7$ (C$_6$H$_4$)C$_2$H$_4$SiCH$_3$(OCH$_3$)$_2$;
CF$_3$(CF$_2$)$_3$CH$_2$CH$_2$Si(OCH$_2$CH$_3$)$_3$;
CF$_3$(CF$_2$)$_5$CH$_2$CH$_2$Si(OCH$_2$CH$_3$)$_3$;
CF$_3$(CF$_2$)$_7$CH$_2$CH$_2$Si(OCH$_2$CH$_3$)$_3$;
CF$_3$(CF$_2$)$_9$CH$_2$CH$_2$Si(OCH$_2$CH$_3$)$_3$;
CF$_3$(CF$_2$)$_7$SO$_2$N(C$_2$H$_5$)C$_2$H$_4$CH$_2$Si (OCH$_3$)$_3$

By using the polysiloxane containing the above-mentioned fluoro alkyl group as a binder, the ink repellent property of the non exposed part of the photocatalyst containing layer can be improved dramatically so that a function of preventing adhesion of a paint for a light shielding part or an ink jet method ink can be realized.

Moreover, as the above-mentioned reactive silicone (2), compounds having a skeleton represented by the following general formula can be presented.

N is an integer of 2 or more, R$^1$, R$^2$ each are a substituted or non substituted alkyl, alkenyl, aryl or cyano alkyl group having 1 to 10 carbon atoms, and 40% or less of the entirety based on the molar ratio is a vinyl, a phenyl, or a halogenated phenyl. Moreover, those having R$^1$, R$^2$ as a methyl group are preferable since the surface energy becomes smallest, and it is preferable that a methyl group accounts for 60% or more based on the molar ratio. Moreover, at least one reactive group such as a hydroxyl group is provided in a molecular chain at the chain end or the side chain.

Moreover, together with the above-mentioned organo polysiloxane, a stable organo silicon compound such as a dimethyl polysiloxane which dose not cross-link can be mixed with the binder.

In the color filter of the present invention, various kinds of binders such as an organo polysiloxane can be used in the photocatalyst containing layer. In the present invention, as mentioned above, it is also possible to contain a fluorine in the photocatalyst containing layer containing such a binder and a photocatalyst, reduce the fluorine in the surface of the photocatalyst containing layer by the energy pattern irradiation, and thereby form the ink-philic area in the ink repellent area. At the time, the fluorine needs to be contained in the photocatalyst containing layer, and as a method for making a fluorine contained in the photocatalyst containing layer containing the binder, a method of bonding a fluorine compound to a binder, having in general a high bonding energy, by relatively weak bonding energy, a method of mixing a fluorine compound bonded by relatively weak bonding energy into the photocatalyst containing layer, or the like can be presented. By introducing a fluorine by such methods, in the case energy is irradiated, first, the fluorine bonding portion having relatively weak bonding energy is decomposed, and thereby the fluorine can be eliminated from the photocatalyst containing layer.

As the above-mentioned first method, that is, as a method of bonding a fluorine compound to a binder having high bonding energy by relatively weak bonding energy, a method of introducing a fluoro alkyl group as a substituent to the above-mentioned organo polysiloxane, or the like can be presented.

For example, as a method for obtaining an organo pollysiloxane, as mentioned above as (1), an organo polysiloxane capable of providing high strength can be obtained by the hydrolysis or the polycondensation of a chloro, alkoxy silane, or the like by the sol gel reaction or the like. Here, according to this method, as mentioned above, an organo polysiloxane is obtained by the hydrolysis condensation or the co-hydrolysis condensation of one kind or two or more kinds of silicon compounds represented by the general formula:

Y$_n$SiX$_{(4-n)}$ (here, Y represents an alkyl group, a fluoro alkyl group, a vinyl group, an amino group, a phenyl group, or an epoxy group, and X represents an alkoxyl group, acetyl group, or a halogen. N is an integer from 0 to 3.). In the general formula, by the synthesis using a silicon compound having a fluoro alkyl group as the substituent Y, an organo polysiloxane having a fluoro alkyl group as a substituent can be obtained. In the case such an organo polysiloxane having a fluoro alkyl group as the substituent is used as a binder, at the time energy is irradiated, since the carbon bonding part of the fluoro alkyl group is decomposed by the function of the photocatalyst in the photocatalyst containing layer, the fluorine content of the part with the energy irradiation of the surface of the photocatalyst containing layer can be reduced.

As the silicon compound having a fluoro alkyl group used at the time, it is not particularly limited as long as it has a fluoro alkyl group, and a silicon compound having at least one fluoro alkyl group, with the fluoro alkyl group having 4 to 30 carbon atoms, preferably 6 to 20 carbon atoms, and particularly preferably 6 to 16 carbon atoms can be used preferably. The specific examples of such a silicon compound are as mentioned above. In particular, the above-mentioned silicon compound having a fluoro alkyl group having 6 to 8 carbon atoms, that is, a fluoro alkyl silane is preferable.

In the present invention, it is possible to use such a silicon compound having a fluoro alkyl group as a mixture with the above-mentioned silicon compound not having a fluoro alkyl group and use the co-hydrolyzed condensation product of them as the above-mentioned organo polysiloxane, or to use one kind or two or more kinds of the silicon compounds having a fluoro alkyl group and use the hydrolyzed condensation product or the co-hydrolyzed condensation product of them as the above-mentioned organo polysiloxane.

In an organo polysiloxane having a fluoro alkyl group accordingly obtained, among the silicon compound constituting the organo polysiloxane, it is preferable that the above-mentioned silicon compound having a fluoro alkyl group is contained by 0.01 mole % or more, and preferably by 0.1 mole % or more.

By containing the fluoro alkyl group to about this degree, the ink repellent property on the photocatalyst containing layer can be improved so that the wettability difference to the part provided as the ink-philic area by the energy irradiation can be made larger.

Moreover, in the above-mentioned method (2), an organo polysiloxane is obtained by cross-linking of a reactive silicone having the excellent water repellent property and the excellent oil repellent property. Also in this case, a fluorine can be contained in the photocatalyst containing layer by having either one or both of $R^1$, $R^2$ in the above-mentioned general formula as a substituent containing a fluorine such as a fluoro alkyl group. Moreover, in the case energy is irradiated, since the fluoro alkyl group part having bonding energy lower than that of the siloxane bond is decomposed, the fluorine content in the surface of the photocatalyst containing layer can be lowered by the energy irradiation.

In contrast, in the latter case, that is, as a method for introducing a fluorine compound bonded by energy lower than the binder bonding energy, for example, in the case of introducing a low molecular weight fluorine compound, for example, a method of mixing a fluorine based surfactant or the like can be presented. Moreover, as a method for introducing a high molecular weight fluorine compound, a method of mixing a fluorine resin having high compatibility with the binder resin, or the like can be presented.

For the photocatalyst containing layer in the present invention, in addition to the above-mentioned photocatalyst and binder, a surfactant can be contained. Specifically, hydrocarbon based ones of the NIKKOL BL, BC, BO, BB series manufactured by Nikko Chemicals Co., Ltd., fluorine or silicone based nonionic surfactants such as ZONYLFSN, FSO manufactured by Dupont, SURFRON S-141, 145 manufactured by Asahi Glass Company, MAGAFAKKU F-141, 144 manufactured by Dainippon Ink and Chemicals, Incorporated, FUTAGENT F-200, F251 manufactured by Neos Corporation, UNIDAIN DS-401, 402 manufactured by DAIKIN INDUSTRIES, Ltd., and FURORADO FC-170, 176 manufactured by 3M, can be presented. Moreover, cationic surfactants, anionic surfactants, amphoteric surfactants can be used as well.

Moreover, for the photocatalyst containing layer, in addition to the above-mentioned surfactants, oligomers and polymers, such as a polyvinyl alcohol, an unsaturated polyester, an acrylic resin, a polyethylene, a diallyl phthalate, an ethylene propylene dien monomer, an epoxy resin, a phenol resin, a polyurethane, a melamine resin, a polycarbonate, a polyvinyl chloride, a polyamide, a polyimide, a styrelene butadiene rubber, a chloroprene rubber, a polypropylene, a polybutylene, a polystyrene, a polyvinyl acetate, a polyester, a polybutadiene, a polybenzimidazol, a polyacrylic nitrile, an epichlorohydrine, a polysulfide, and a polyisoprene can be contained.

The photocatalyst content in the photocatalyst containing layer may be set in a range of 5 to 60% by weight, preferably 20 to 40% by weight. Moreover, the thickness of the photocatalyst containing layer is preferably in a range of 0.05 to 10 μm.

The above-mentioned photocatalyst containing layer can be formed by dispersing the photocatalyst and the binder in a solvent, with the other additives as needed, so as to prepare a coating solution, and coating the coating solution. As the solvent to be used, alcohol based organic solvents such as an ethanol, and an isopropanol are preferable. The coating operation can be carried out by a known coating method such as spin coating, spray coating, dip coating, roll coating and bead coating. In the case an ultraviolet ray curing type component is contained as the binder, the photocatalyst containing layer can be formed by executing a curing treatment by irradiating an ultraviolet ray.

(Transparent Substrate)

As a transparent substrate used for the manufacturing method for a color filter of the present invention, it is not particularly limited as long as it is one conventionally used for a color filter. For example, a transparent rigid material without flexibility, such as a quartz glass, a pyrex glass, and a synthetic quartz plate, and a transparent flexible material having flexibility, such as a transparent resin film and an optical resin plate can be used. Among these, since the 7059 glass manufactured by Coning is a material having a small thermal expansion coefficient having the excellent size stability and the workability in a high temperature heating process, and furthermore, it is anon alkaline glass not containing an alkaline component in the glass, it is suitable for a color filter for a color liquid crystal display by the active matrix method. In the present invention, as the transparent substrate, in general transparent one is used, but a reflective substrate and a substrate colored in white can be used as well. Moreover, the transparent substrate with a surface treatment for preventing the alkaline elution, for providing the gas barrier property, and for other purposes can be used as needed.

3. Others

In the method for manufacturing a color filter of the present invention, various processes for manufacturing a member constituting a color filter may be comprised, as needed.

(Light Shielding Part Forming Process)

In the manufacturing method for a color filter of the present invention, a light shielding part forming process for forming a light shielding part (black matrix) can be provided. The light shielding part forming process may be carried out either before the above-mentioned pixel part forming process or after execution of the pixel part forming process.

As the light shielding part forming process, for example, a method of forming a thin metal film of a chromium, or the like by about 1,000 to 2,000 Å thickness by a sputtering method, a vacuum deposition method, or the like, and patterning the thin film can be used. As the patterning method, an ordinary patterning method such as sputtering can be used.

Moreover, it may be a method of forming a light shielding part containing light shielding particles such as carbon fine particles, a metal oxide, an inorganic pigment and an organic pigment in the resin binder. As the resin binder to be used, one kind or a mixture of two or more kinds of resin such as a polyimide resin, an acrylic resin, an epoxy resin, a polyacrylamide, a polyvinyl alcohol, a gelatin, a casein, a cellulose, a photosensitive resin, and furthermore, an O/W emulsion type resin composition such as an emulsion of a reactive silicone, or the like can be used. The thickness of such a resin light shielding part can be set in a range of 0.5 to 10 μm. As a method for patterning the resin light shielding part, a commonly used method such as photolithography and a printing method can be used.

(Protective Layer Forming Process)

In the manufacturing method for a color filter of the present invention, furthermore, a protective layer forming process of forming a protective layer on the pixel part can be carried out. The protective layer is provided for flattening the color filter and preventing elution of the component in the pixel part, or in the pixel part and the photocatalyst containing layer to the liquid crystal layer.

The protective layer thickness can be set in consideration of the light transmittance of the material to be used, the color filter surface state, or the like, and for example it can be set in a range of 0.1 to 2.0 µm. For example, the protective layer can be formed using one having required light transmittance, or the like for the transparent protective layer from the known transparent photosensitive resin, two liquid curing type transparent resin, or the like.

4. An Example of the Manufacturing Method.

Hereinafter, with reference to FIG. 1, an example of the method for manufacturing a color filter of the present invention will be explained.

Figure 1A:
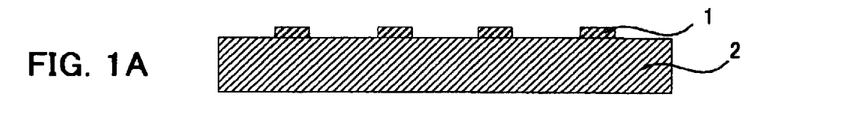
Figure 1B:
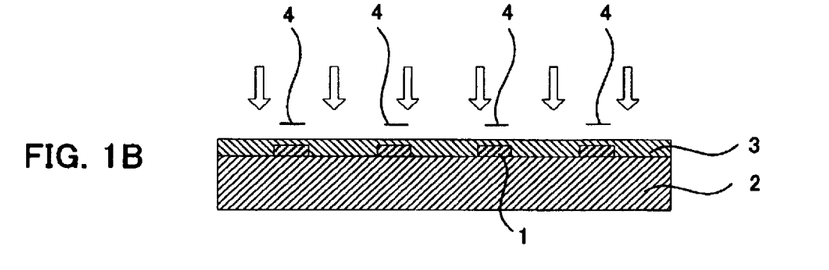
Figure 1C:
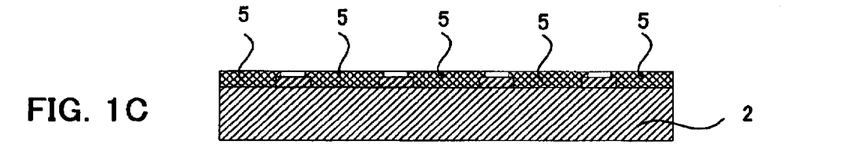
Figure 1D:
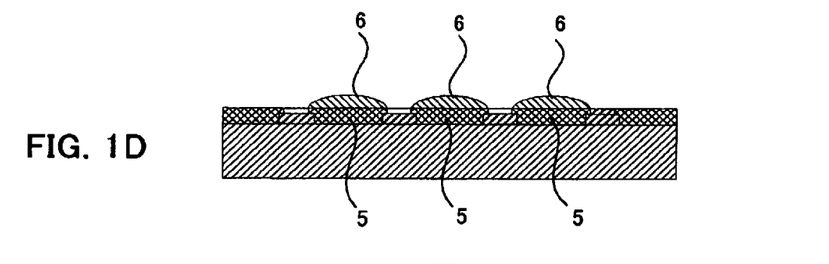
Figure 1E:
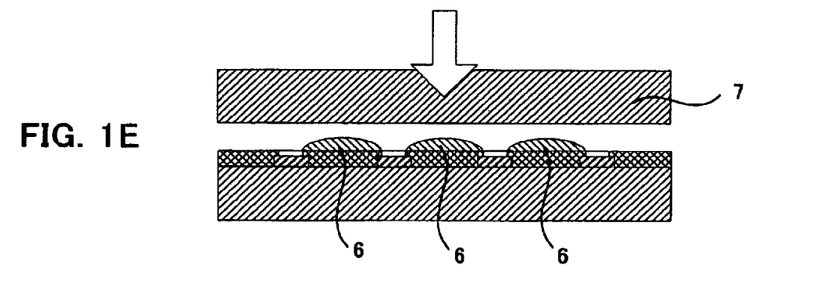
Figure 1F:
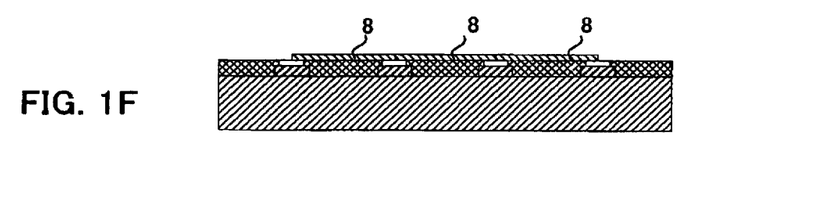

In the example, first, a transparent substrate 2 with a light shielding part 1 formed is prepared (FIG. 1A). Then, a photocatalyst containing layer 3 is formed on the surface of the transparent substrate 2 on the side with the light shielding part 1 formed. Then, exposure is carried out with a mask 4 placed such that only the pixel part forming part which is the part for forming the pixel part on the above-mentioned photocatalyst containing layer 3 can be exposed (FIG. 1B). The pixel part forming part on the photocatalyst containing layer 3 is exposed so as to provide an ink-philic exposing part for pixel part 5 (FIG. 1C). An ink 6 is adhered on the exposing part for pixel part 5 by the discharging method (FIG. 1D). Here, the ink 6 is processed to be in a semi cured state as needed. Then, the ink 6 is pressed by a plane press 7 in this example (FIG. 1E). Finally, by applying curing process to the ink 6, a flat pixel part 8 is formed (FIG. 1F). Thereafter, by forming a transparent electrode layer, a protective layer, or the like, as needed, a color filter can be provided.

B. Color Filter

Next, a color filter of the present invention will be explained. The color filter of the present invention comprises at least a transparent substrate, and a pixel part of a plurality of colors formed in a predetermined pattern by adhering an ink by a discharging method on the transparent substrate, and the thickness difference of each above-mentioned pixel part is in a range of ±0.5 µm, preferably in a range of ±0.3 µm, and particularly preferably in a range of +0.1 µm.

Since the color filter of the present invention has the pixel part thickness difference in the above-mentioned range, the cell gap can be provided evenly in the case of providing a color liquid crystal display. Moreover, a high quality color filter without the color unevenness, or the like can be provided.

Such a color filter with little pixel part thickness difference can be manufactured, for example, by the above-mentioned manufacturing method for a color filter.

Since the transparent substrate, the discharging method, the pixel part, or the like of the color filter of the present invention are same as those explained for the above-mentioned manufacturing method for a color filter, explanation is omitted here. Moreover, as in the one explained for the method for manufacturing a color filter, a light shielding part (black matrix) can be formed in the color filter of the present invention. Furthermore, it is also same as the explanation of the above-mentioned manufacturing method for a color filter that the pixel part can be formed preferably by the ink jet method, the pixel part is formed preferably with the UV curing type ink, or the like.

C. Color Liquid Crystal Display

By combining the above-mentioned color filter and a counter substrate facing the color filter, and sealing a liquid crystal compound between them, a color liquid crystal display can be formed. The color liquid crystal display accordingly obtained has the advantages of the color filter of the present invention, that is, the cell gap can be evened, and the problems of the color unevenness or the like can be reduced.

The present invention is not limited to the above-mentioned embodiments. The above-mentioned embodiments are merely examples, and anyone having the substantially same configuration as the technological idea disclosed in the claims of the present invention and achieves the same effects is included in the technological scope of the present invention.

EXAMPLES

Hereinafter, the present invention will be explained in further details with reference to the examples.

1. Formation of the Photocatalyst Containing Layer 3 g of an isopropyl alcohol, 0.001 g of a fluoro alkyl silane (manufactured by Tokemu products Corp., product name: MF-160E, a 50% by weight isopropyl ether solution of an N-[3-(trimethoxy silyl) propyl]-N-ethyl perfluoro octane sulfone amide), and 2 g of a titanium oxide sol (manufactured by Ishihara Sangyo Kaisha, Ltd., product name: ST-K01) were mixed and agitated at 100° C. for 20 minutes.

The solution was applied on a soda glass transparent substrate having a black matrix (light shielding part) comprising a chromium thin film pattern having a 0.7 mm thickness, a 90 µm×300 µm opening part, and a 30 µm line width, by spin coating. After heating at 150° C. for 20 minutes, a photocatalyst containing layer having a 0.15 µm thickness was obtained.

The contact angle of the photocatalyst containing layer with a wettability index standard solution of 40 mN/m (manufactured by Junsei Kagaku Corp.) was measured using a contact angle measuring device (CA-Z type manufactured by Kyowa Kaimen Kagaku Corp.), and it was 70°.

Then, as a result of executing the ultraviolet ray irradiation to the photocatalyst containing layer surface by 20 mW/cm$^2$ (365 nm) illuminance with a super high pressure mercury lamp, it took 120 seconds to have a 0° contact angle with the 40 mN/m wettability index standard solution.

2. Formation of the Pixel Part

By irradiating (for 50 seconds at 70 mW/cM$^2$) the transparent substrate, with the above-mentioned photocatalyst containing layer formed, with a mercury lamp (wavelength 365 nm) via masks for a red pattern, a green pattern and a blue pattern, the red pattern, green pattern and blue pattern irradiating parts were provided collectively as the ink-philic area (10° or less based on the water contact angle).

The red pattern, green pattern and blue pattern on the mask are formed adjacently with the pattern interval between the colors are formed by the black matrix line width or less.

In contrast, 1 g of C. I. pigment red 168 was mixed with 10 g of an aqueous solution of a water based emulsion silicone (manufactured by Shin-Etsu Chemical Co., Ltd., product name: K-768) dissolved by three times with water. After dispersing the obtained mixture with three rolls ink mill, centrifugal separation was carried out at 12,000 r.p.m. Then, it was filtrated with a 1 µm glass filter. 0.1 g of Catalyst PM-6A: Catalyst PM-6B=4:6 (manufactured by Shin-Etsu Chemical Co., Ltd.) was added to the obtained water based colored resin solution as the curing catalyst so as to prepare a coating solution for a red pattern (thermosetting type resin composition).

Next, the above-mentioned coating solution for red pattern was dropped selectively on the red pattern ink-philic area on the photocatalyst containing layer by an discharging nozzle. Thereafter, by applying a heating treatment at 100° C. for 30 seconds, the red pattern was processed to be in a semi cured state.

Then, 1 g of C. I. pigment blue 60 was mixed with 10 g of an aqueous solution of a water based emulsion silicone (manufactured by Shin-Etsu Chemical Co., Ltd., product name: K-768) dissolved by three times with water. A coating solution for a blue pattern (thermosetting type resin composition) was prepared in the same manner as in the case of the above-mentioned coating solution for red pattern. Then, the above-mentioned coating solution for blue pattern was dropped selectively on the blue pattern ink-philic area on the photocatalyst containing layer by and is charging nozzle. Thereafter, by applying a heating treatment at 100° C. for 30 seconds, the blue pattern was processed to be in a semi cured state.

Next, 1 g of Rionol Green 2Y-301 (manufactured by Toyo Ink Manufacturing Corp.) was mixed with 10 g of a 10% by weight aqueous solution of a polyvinyl alcohol (average polymerization degree 1,750, saponification degree 88 mole %). After dispersing the obtained mixture with three rolls ink mill, centrifugal separation was carried out at 12,000 r.p.m. Then, it was filtrated with a 1 μm glass filter. By adding 1% by weight of an ammonium bichromate to the obtained water based colored resin solution as the cross-linking agent, a coating solution for a green pattern (photosensitive resin composition) was prepared.

Next, the above-mentioned coating solution for green pattern was dropped selectively on the green pattern ink-philic area on the photocatalyst containing layer by an discharging nozzle. Thereafter, by applying a heating treatment at 100° C. for 30 seconds, the green pattern was processed to be in a semi cured state.

3. Pixel Part Flattening Process

Then, the above-mentioned three color patterns in a semi cured state on the glass substrate were crushed by applying a constant speed and a constant pressure by passing through a blanket roll with the conditions of the roll pressure: 1 kg/cm$^2$, the conveyance speed: 5 m/min, and the roll surface temperature: 23° C. so as to provide an even linear pressure over the entire glass substrate. The blanket roll surface was made of a 1 mm thickness phenyl-methyl silicone rubber. The rubber surface roughness Ra was 1 μm or less, and the hardness was 50 to 80°. After crushing the above-mentioned colored patterns, a curing treatment was executed at 180° C. for 20 minutes so as to form a pixel part on the glass substrate.

4. Formation of the Color Filter and Evaluation Thereof.

Next, a two liquid mixing type thermosetting agent (manufactured by Nihon Gosei Gomu Co., product name; SS7265) was coated on the coloring layer as the protective layer by a spin coater. By applying a curing treatment at 200° C. for 30 minutes, a protective layer was formed so as to obtain a color filter of the present invention.

The obtained color filter had a high quality without the color unevenness in the pixel part. Moreover, the thickness difference between each pixel part was measured, and it was within 0.2 μm so that it was learned that it was a color filter having the flat surface.

What is claimed is:

1. A method for manufacturing a color filter comprising at least a pixel part forming process of forming a pixel part of plurality of colors in a predetermined pattern in an ink-philic area by adhering an ink on a transparent substrate having an ink-philic area pattern in an ink repellent area by a discharging method, and a convex pixel part is formed in the pixel part forming process, wherein a pixel part flattening process of flattening the convex pixel part, by scraping off the upper part of the pixel part using a doctor blade, is executed after the pixel part forming process.

2. The method for manufacturing a color filter according to claim 1, further comprising a process of forming a light shielding part.

3. The method for manufacturing a color filter according to claim 1, wherein the pixel part flattening process is executed after making the convex pixel part in a semi-cured state.

4. The method for manufacturing a color filter according to claim 1, wherein the discharging method is executed by an ink jet method.

5. The method for manufacturing a color filter according to claim 1, wherein the pixel part forming process is a process of forming a wettability variable layer, capable of changing a contact angle with a liquid measured using a contact angle measuring device, on the transparent substrate, and adhering an ink in an ink-philic area of the wettability variable layer.

6. The method for manufacturing a color filter according to claim 5, wherein the wettability variable layer is a photocatalyst containing layer comprising at least a photocatalyst and a binder, and the wettability is changed by an irradiation of an ultraviolet ray, a visible ray, and/or heat so as to lower the contact angle with a liquid measured using the contact angle measuring device.

7. The method for manufacturing a color filter according to claim 6, wherein the photocatalyst is one kind or two or more kinds of substances selected from a titanium oxide ($TiO_2$), a zincoxide (ZnO), atinoxide ($SnO_2$), a strontiumtitanate ($SrTiO_3$), a tungsten oxide ($WO_3$), a bismuth oxide ($Bi_2O_3$), and an iron oxide ($Fe_2O_3$).

8. The method for manufacturing a color filter according to claim 7, wherein the photocatalyst is a titanium oxide ($TiO_2$).

9. The method for manufacturing a color filter according to claim 6, wherein the binder is an organo polysiloxane as a hydrolyzed condensation product or a co-hydrolyzed condensation product of one kind or two or more kinds of silicon compounds represented by $Y_nSiX_{(4-n)}$ here, Y is an alkyl group, a fluoro alkyl group, a vinyl group, an amino group, a phenyl group or an epoxy group, and X is an alkoxyl group or a halogen, n is an integer from 0 to 3).

10. The method for manufacturing a color filter according to claim 6, wherein the contact angle with a liquid having a 40 mN/m surface tension, on the photocatalyst containing layer, is 10 degrees or more at a part without the irradiation of the ultraviolet ray, the visible ray, and/or heat, and less than 10 degrees at a part with the irradiation of the ultraviolet ray, the visible ray, and/or heat.

11. A color filter manufactured by the manufacturing method according to claim 1.

12. A method for manufacturing a color filter comprising at least a pixel part forming process of forming a pixel part of a plurality of colors in a predetermined pattern in an ink-philic area by adhering an ink on a transparent substrate having an ink-philic area pattern in an ink repellent area by a discharging method, and a convex pixel part is formed in the pixel part forming process, wherein a pixel part flattening process of flattening the convex pixel part, by cutting off the upper part of the pixel part using a blade cutter, is executed after the pixel part forming process.

13. The method for manufacturing a color filter according to claim 12, further comprising a process of forming a light shielding part.

14. The method for manufacturing a color filter according to claim 12, wherein the pixel part flattening process is executed after making the convex pixel part in a semi-cured state.

15. The method for manufacturing a color filter according to claim 12, wherein the discharging method is executed by an ink jet method.

16. The method for manufacturing a color filter according to claim 12, wherein the pixel part forming process is a process of forming a wettability variable layer, capable of changing a contact angle with a liquid measured using a contact angle measuring device, on the transparent substrate, and adhering an ink in an ink-philic area of the wettability variable layer.

17. The method for manufacturing a color filter according to claim 16, wherein the wettability variable layer is a photocatalyst containing layer comprising at least a photo catalyst and a binder, and the wettability is changed by an irradiation of an ultraviolet ray, a visible ray, and/or heat so as to lower the contact angle with a liquid measured using the contact angle measuring device.

18. The method for manufacturing a color filter according to claim 17, wherein the photocatalyst is one kind or two or more kinds of substances selected from a titanium oxide ($TiO_2$), a zinc oxide (ZnO), a tinoxide ($SnO_2$), a strontiumtitanate ($SrTiO_3$), a tungsten oxide ($WO_3$), a bismuth oxide ($Bi_2O_3$), and an iron oxide ($Fe_2O_3$).

19. The method for manufacturing a color filter according to claim 18, wherein the photocatalyst is a titanium oxide ($TiO_2$).

20. The method for manufacturing a color filter according to claim 17, wherein the binder is an organo polysiloxane as a hydrolyzed condensation product or a co-hydrolyzed condensation product of one kind or two or more kinds of silicon compounds represented by $Y_n SiX_{(4-n)}$ (here, Y is an alkyl group, a fluoro alkyl group, a vinyl group, an amino group, a phenyl group or an epoxy group, and X is an alkoxyl group or a halogen, n is an integer from 0 to 3).

21. The method for manufacturing a color filter according to claim 17, wherein the contact angle with a liquid having a 40 mN/m surface tension, on the photocatalyst containing layer, is 10 degrees or more at a part without the irradiation of the ultraviolet ray, the visible ray, and/or heat, and less than 10 degrees at a part with the irradiation of the ultraviolet ray, the visible ray, and/or heat.

22. A color filter manufactured by the manufacturing method according to claim 12.

* * * * *